P. F. HABERSTICK.
EMERGENCY TRACTION DEVICE.
APPLICATION FILED AUG. 14, 1915.
1,201,578.
Patented Oct. 17, 1916.
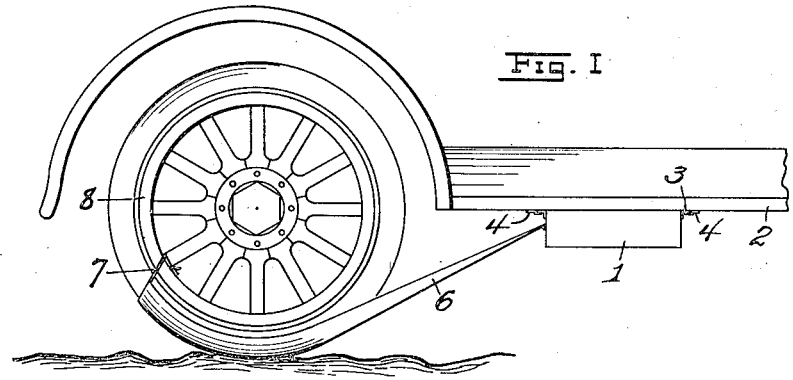
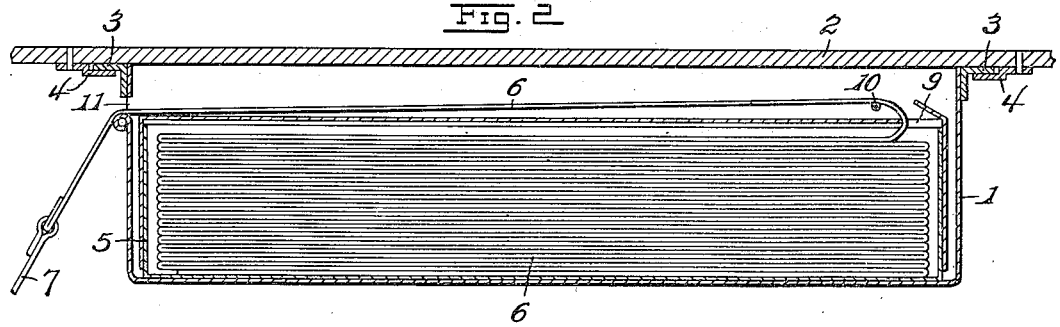
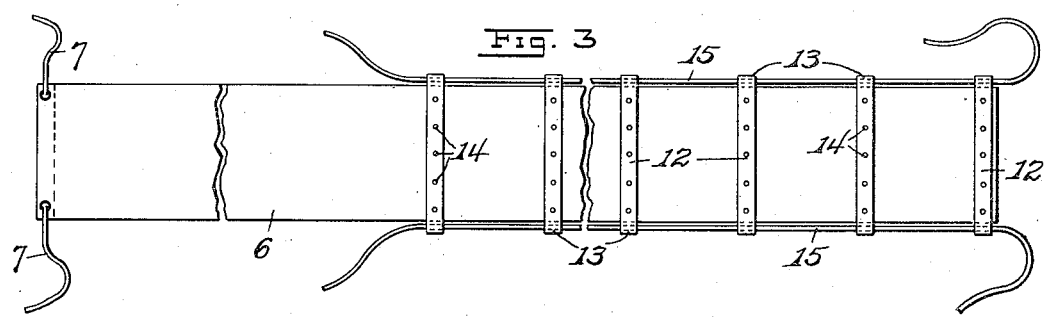
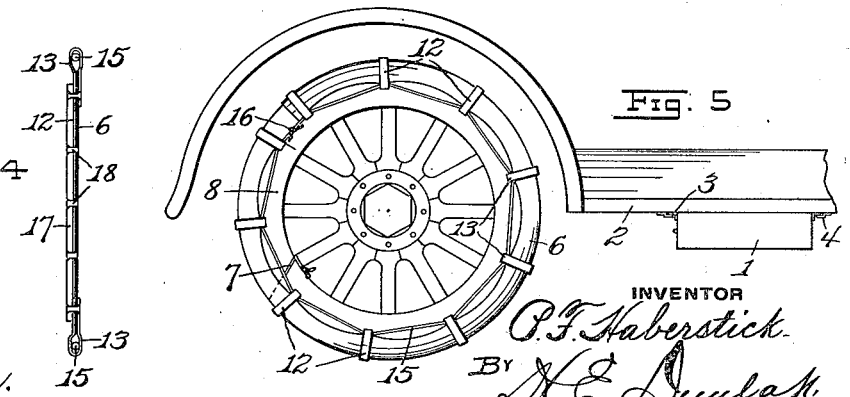
WITNESSES
W. F. Rogers.
W. F. Keefer.
INVENTOR
P. F. Haberstick.
BY
N. E. Dunlap
ATTORNEYS

UNITED STATES PATENT OFFICE.

PETER F. HABERSTICK, OF WHEELING, WEST VIRGINIA.

EMERGENCY TRACTION DEVICE.

1,201,578.  Specification of Letters Patent.  Patented Oct. 17, 1916.

Application filed August 14, 1915. Serial No. 45,544.

*To all whom it may concern:*

Be it known that I, PETER F. HABERSTICK, a citizen of the United States of America, and resident of Wheeling, county of Ohio, and State of West Virginia, have invented certain new and useful Improvements in Emergency Traction Devices, of which the following is a specification.

This invention relates broadly to traction assisting devices for automobiles; and it has for its primary object to provide an emergency device for affording positive traction for the rear wheels of a motor vehicle whereby the same are enabled to pull out of ruts, mud holes and other places where insufficient frictional resistance is offered to enable the vehicle to advance, and further to provide an easy and convenient means of attaching such device to the traction wheels of such vehicles.

A further object is to provide an emergency device of the character mentioned which may be fixedly attached in embracing relation to the tire of the wheel and made to serve the purpose of an ordinary tire chain and also as a temporary tire protector. And a still further object of the invention is to provide a device of the character mentioned the used or wearing parts of which may be readily renewed at small expense as occasion may require.

With these and other objects in view, the invention resides in the novel features of construction which will hereinafter be exemplified, reference being had to the accompanying drawings, in which—

Figure 1 is a side elevation of the invention applied to an automobile and showing the fabric strip occupying its initial working position; Fig. 2 is an enlarged central longitudinal section of the invention; Fig. 3 is a broken plan view of the fabric strip, showing the attaching means therefor; Fig. 4 is an enlarged section of the same, showing a modification; and Fig. 5 is a view similar to Fig. 1, showing the strip applied as a tire protector and anti-skid device.

Referring to said drawings, in which like designating characters distinguish like parts throughout the several views, 1 indicates a substantially rectangular sheet-metal casing designed for attachment to the under side of the running board 2 of an automobile, said casing having end flanges 3 adapted to be slipped into engagement with suitable supporting bars 4 which are permanently mounted on said running board. Fitted within said casing is a suitable removable container, as a pasteboard box or carton 5, within which is disposed a long narrow strip of fabric 6, as canvas, jute, or other suitable material. Said fabric is folded within said box or carton in even flat return layers, as shown in Fig. 2. Attached to the upper or free end of said fabric strip are suitable devices whereby said end may be attached to the wheel 8 of a vehicle, as, for example, clasps, clamps, or a pair of strong thongs or cords 7.

When occasion requires, the casing with the container seated therein is mounted in place on the running board, the free end of the fabric strip being first passed outward through a slot 9 provided in the carton top or cover adjacent to its front end, thence over a transverse rod 10 which is disposed in overlying relation to the carton and has its ends fixed to the sides of the casing, and thence rearward and outward through a slot 11 provided in the rear end of said casing, after which the cords 7 are attached to the wheel 8, as shown in Fig. 1; whereupon traction movement of said wheel will carry the fabric strip under and around the wheel, removing the latter from contact with the ground and affording a dry surface which will offer sufficient frictional resistance to prevent ineffective spinning of said wheel and to readily enable the latter to climb thereon from a non-effectual working position, as in a mud-hole or the like. In other words, rotation of the traction wheel in either a forward or rearward direction acts to unwind and spread the fabric in the path of the wheel, presenting a dry surface whereon frictional resistance to the free turning of the wheel is encountered, resulting in the utilization of the traction force exerted.

Beginning at the bottom or rear end of the fabric strip and located at suitably spaced intervals for a suitable distance from said end are transverse strips 12 of tape or other suitable material which terminate at opposite ends in loops 13 located laterally of the lateral edges of the fabric, as shown in Figs. 3 and 4, said tape strips being permanently secured to said fabric strip by rivets 14 or in any other suitable manner. A strong cord, or equivalent element, 15 is directed longitudinally through the loops 13 at each side of the fabric strip and has its opposite ends free, as shown in Fig. 3. When it is desired to employ the fabric strip as a temporary tire protector or as a non-skid tire cover, the same is drawn out of the casing in the manner hereinbefore described—that is, by causing the wheel to travel forward thereover—until the rear end thereof has been withdrawn from the casing, at which time two or more thicknesses of said fabric will be wound about said wheel and the opposite ends of the cords 15 may be brought into meeting relation, the foremost and rearmost of the cord-receiving loops 13 being spaced apart a distance substantially corresponding to the circumference of the tire. When so wound about the tire, said cords 15 are drawn tight and their opposite ends tied or otherwise securely connected, as shown at 16 in Fig. 5, thus causing the fabric strip 6 to closely hug and incase the tire. The transverse tape strips 12 serve in a measure the purpose of the cross-links of an ordinary tire-chain. For use on very heavy vehicles the tread portions of said transverse strips may be reinforced, or rendered more efficient as grips, by the provision of heavy transverse cleat-like strips 17 of leather, rubber, or other suitable material, secured to the fabric strip by rivets 18, as shown in Fig. 4.

Refills, or new supplies of the fabric strips, may be supplied at relatively small cost, the same being preferably furnished in the cardboard boxes or cartons 5 ready to be introduced in the casing 1.

The casing is preferably made of a size which may be conveniently accommodated within the usual tool-carrying receptacles of cars and is adapted to be transferred to its place on the running board when an emergency arises requiring the use of the device.

It will be obvious that other materials, as woven, hinged or linked metal, or chains, may be substituted for the fabric strip herein shown and described, in which case the operation and functions of the device will not be materially changed.

It will be understood that, while I have herein shown and described a practical embodiment of the invention, the latter is not confined to a strict conformity with the showing of the drawings, but may be changed and modified to the extent that the changes and modifications mark no material departure from the salient features of the invention as defined in the appended claims.

What is claimed is—

1. An emergency traction device for vehicles, comprising a length of suitable material having an end adapted for attachment to a traction wheel and to be wound around the tire of the latter by traction movement thereof, loops formed along the lateral edges of said material adjacent to the rear end thereof, and longitudinally directed cords received in said loops, said cords being designed to have their opposite ends connected for securing said material in incasing relation to said tire.

2. An emergency traction device for vehicles, comprising a strip of suitable material having an end adapted for attachment to a traction wheel and to be wound around the tire of the latter by traction movement thereof, and longitudinally disposed cords arranged laterally of and secured to said material adjacent to the rear end thereof whereby the same may be secured in incasing relation to said tire.

3. An emergency traction device for vehicles, comprising a strip of suitable material having an end adapted for attachment to a traction wheel and to be wound around the tire of the latter by traction movement thereof, transversely disposed strips of tape secured to said material and disposed at intervals throughout a suitable distance from the rear end thereof and terminating in loops at opposite sides of said material, and longitudinally disposed cords mounted in said loops and designed to have their opposite ends connected for securing said material in incasing relation to said tire.

4. An emergency traction device for vehicles, comprising a strip of suitable pliable material having an end adapted for attachment to a traction wheel and to be wound around the tire of the latter by traction movement thereof, transversely disposed strips of tape secured to said material and disposed at intervals throughout a distance substantially corresponding to the circumference of the tire, said tape strips terminating in loops adjacent to the lateral edges of said material, and longitudinally extending cords slidably received by said loops and adapted to have their ends connected for securing said material in incasing relation to said tire.

5. An emergency traction device for vehicles, comprising a casing adapted for mounting in a stationary position in front of a traction wheel, a fabric strip suitably disposed within said casing, means for attaching an end of said strip to said wheel, said strip being adapted to be drawn lengthwise from said casing and spread in the path of said wheel by rotation of the latter, and means carried by said strip whereby the latter may be attached to said wheel in incasing relation to the tire thereof.

6. An emergency traction device for vehicles, comprising a casing adapted for mounting in a stationary position in front of a traction wheel, a strip of suitable material suitably disposed within said casing, means for attaching an end of said material to said wheel, said material being adapted to be drawn lengthwise from said casing and spread in the path of said wheel by rotation of the latter, and means carried by the rear end of said material whereby, when wholly withdrawn from the casing, said material may be secured in incasing relation to the wheel.

In testimony whereof, I affix my signature in presence of two subscribing witnesses.

PETER F. HABERSTICK.

Witnesses:
W. F. KEEFER,
H. E. DUNLAP.